(12) United States Patent
Sutherland

(10) Patent No.: US 6,382,661 B1
(45) Date of Patent: May 7, 2002

(54) VEHICLE STEERING WHEEL HAVING INFLATABLE DEVICES

(75) Inventor: Daniel R. Sutherland, Eastpointe, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/717,960

(22) Filed: Nov. 20, 2000

(51) Int. Cl.7 .............................................. B60R 21/16
(52) U.S. Cl. ................... 280/728.2; 280/731; 280/736; 74/552
(58) Field of Search ................................ 280/736, 741, 280/728.2, 731; 74/552

(56) References Cited

U.S. PATENT DOCUMENTS

| | | |
|---|---|---|
| 2,842,372 A | 7/1958 | D'Antini |
| 2,899,214 A | 8/1959 | D'Antini |
| 5,398,963 A * | 3/1995 | Fohl |
| 5,482,315 A * | 1/1996 | Chandler et al. |
| 6,298,750 B1 * | 10/2001 | Kerner et al. .................. 74/552 |

FOREIGN PATENT DOCUMENTS

JP          9-249088       *    9/1997

* cited by examiner

Primary Examiner—Paul N. Dickson
(74) Attorney, Agent, or Firm—Tarolli, Sundheim, Covell, Tummino & Szabo, L.L.P.

(57) ABSTRACT

An apparatus (10) for helping to protect a vehicle occupant in the event of a vehicle collision comprises a steering wheel (11) including a steering wheel armature (12). The steering wheel armature (12) has a centrally located hub portion (20), a circumferentially extending rim portion (22), and at least one spoke (24, 46) extending between the rim portion and the hub portion. At least one inflatable vehicle occupant protection device (122, 132, 134) is mounted on the steering wheel armature (12). An actuatable inflator (100), when actuated, inflates the inflatable vehicle occupant protection device (122, 132, 134). The inflator (100) forms at least a portion of the at least one spoke (24, 46) of the steering wheel armature (12).

15 Claims, 4 Drawing Sheets

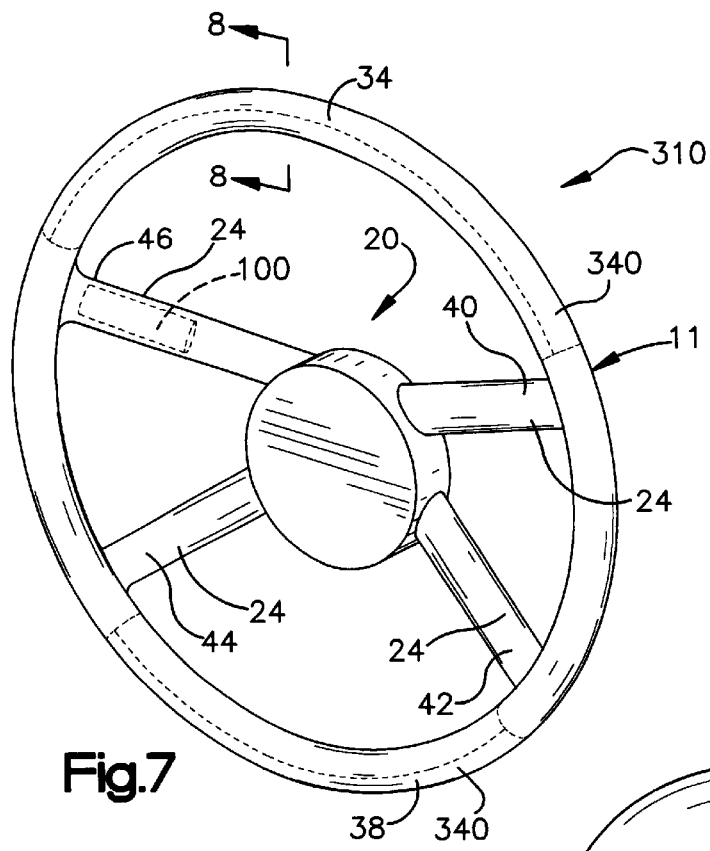
Fig.7
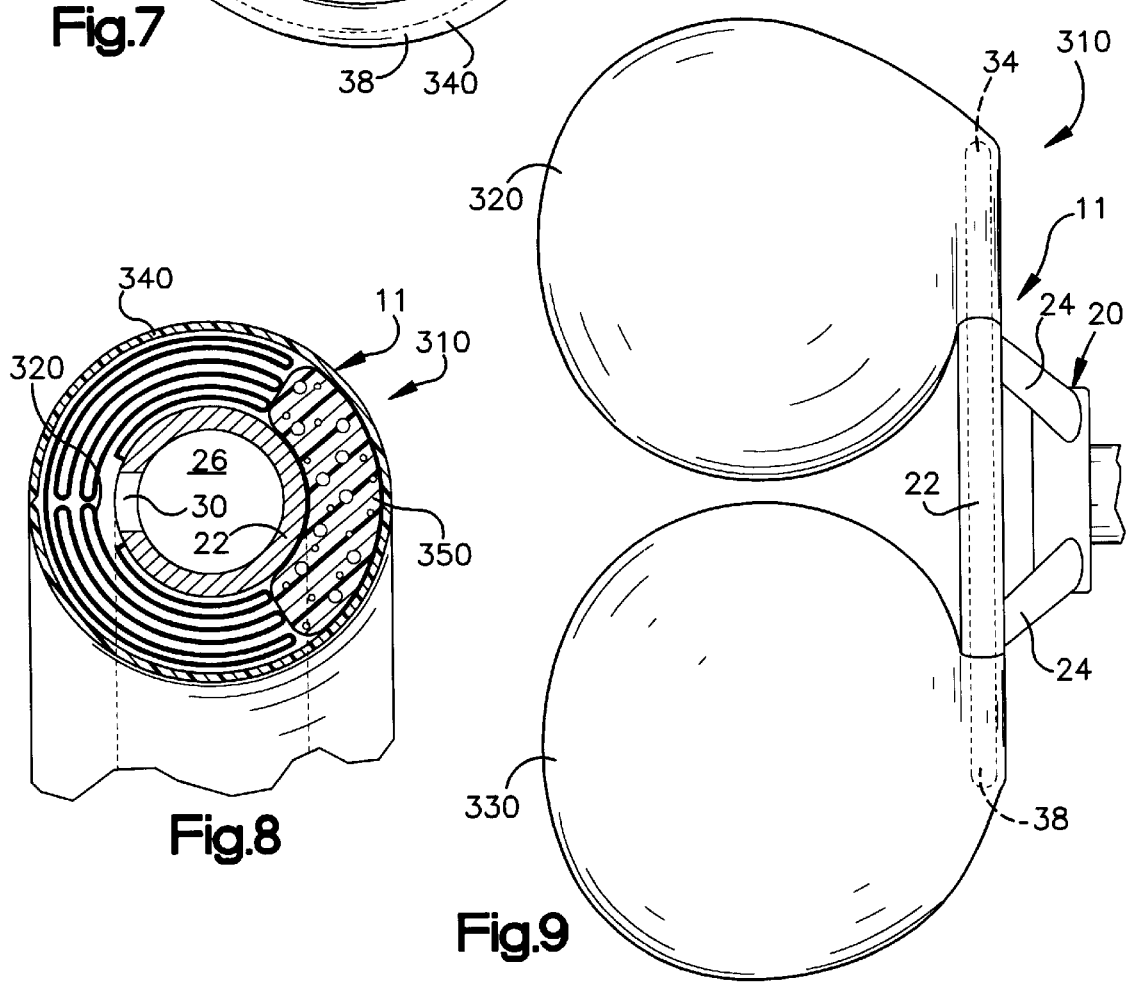
Fig.8
Fig.9

VEHICLE STEERING WHEEL HAVING INFLATABLE DEVICES

FIELD OF THE INVENTION

The present invention is directed to an apparatus for helping to protect a vehicle occupant in the event of a vehicle collision, and is particularly directed to a vehicle steering wheel having one or more inflatable devices for helping to protect a vehicle occupant in a vehicle collision.

BACKGROUND OF THE INVENTION

It is known to mount an inflatable vehicle occupant protection device, such as an air bag module, on a vehicle steering wheel to help protect a vehicle driver from injury in the event of a vehicle collision. The air bag module typically includes an inflatable air bag and an air bag inflator that are secured to a centrally located hub portion of the steering wheel. Efforts are constantly being made to reduce the size of the air bag module in order to make the air bag module less obtrusive.

It is also known that a driver-side air bag module can be less effective at helping to protect a vehicle driver in a vehicle collision when the driver is not seated properly, e.g., leaning forward, in the driver seat. Various methods, such as pretensioning of a driver's seat belt, are known for helping to reposition a so-called "out-of-position" driver prior to deployment of a driver-side air bag in order to improve the effectiveness of the air bag in helping to protect the driver.

SUMMARY OF THE INVENTION

The present invention is an apparatus for helping to protect a vehicle occupant in the event of a vehicle collision. The apparatus comprises a steering wheel including a steering wheel armature. The steering wheel armature has a centrally located hub portion, a circumferentially extending rim portion, and at least one spoke extending between the rim portion and the hub portion. At least one inflatable vehicle occupant protection device is mounted on the steering wheel armature. An actuatable inflator, when actuated, inflates the inflatable vehicle occupant protection device. The inflator forms at least a portion of the spoke of the steering wheel armature.

The rim portion of the steering wheel armature is hollow and is in fluid communication with the inflator mounted in the at least one spoke. The rim portion includes a plurality of fluid exit openings.

In accordance with one embodiment of the present invention, the steering wheel includes an expandable material covering portions of the rim portion. The fluid exit openings are located in the portions of the rim portion covered by the expandable material. The expandable material on the rim portion forms a first inflatable vehicle occupant protection device. The expandable material on the rim portion further forms a second inflatable vehicle occupant protection device diametrically opposed to the first inflatable vehicle occupant protection device on the rim portion.

In accordance with another embodiment of the present invention, the inflatable vehicle occupant protection device includes an air bag mounted to the hub portion of the steering wheel armature. The hub portion of the steering wheel armature includes fluid passages for directing inflation fluid from the inflator into the air bag. The steering wheel includes an expandable material covering portions of the rim portion. The fluid exit openings are located in the portions of the rim portion covered by the expandable material. The expandable material on the rim portion forms second and third inflatable vehicle occupant protection devices.

In accordance with yet another embodiment of the present invention, the inflatable vehicle occupant protection device comprises diametrically opposed first and second air bags located on the rim portion of the steering wheel armature.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 7 is a perspective view of an apparatus for helping to protect a vehicle occupant constructed in accordance with a third embodiment of the present invention;

FIG. 8 is a sectional view taken along line 8—8 in FIG. 7; and

FIG. 9 is a perspective view illustrating the apparatus of FIG. 7 in a deployed condition.

DESCRIPTION OF PREFERRED EMBODIMENTS

Figure 1:
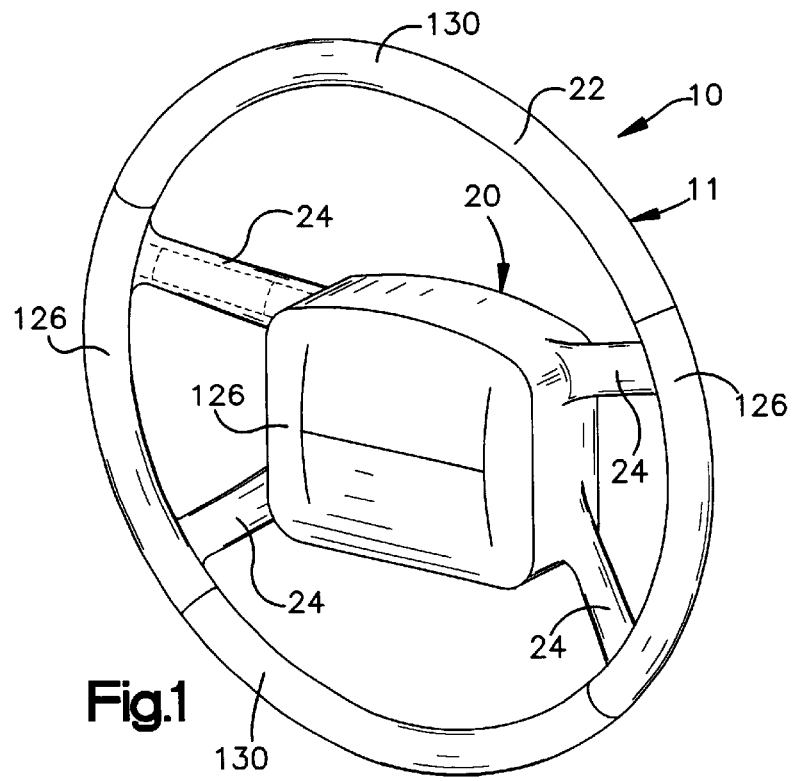
FIG. 1 is a perspective view of an apparatus for helping to protect a vehicle occupant constructed in accordance with a first embodiment of the present invention.

The present invention is directed to an apparatus for helping to protect a vehicle occupant in the event of a vehicle collision, and is particularly directed to a vehicle steering wheel having one or more inflatable devices for helping to protect a vehicle occupant in a vehicle collision. As representative of the present invention, FIG. 1 illustrates an apparatus 10 constructed in accordance with a first embodiment of the invention.

The apparatus 10 comprises a steering wheel 11 including a steering wheel armature 12 (FIG. 2) and an inflatable vehicle occupant protection device 14 mounted on the steering wheel armature. The steering wheel armature 12 includes a centrally located hub 20, a circumferentially extending rim 22, and a plurality of spokes 24 extending between the hub and the rim. The rim 22 is a hollow steel tube having an internal passage 26. The rim 22 includes a fluid inlet port 28 (FIG. 4) that is in fluid communication with the internal passage 26.

Figure 2:
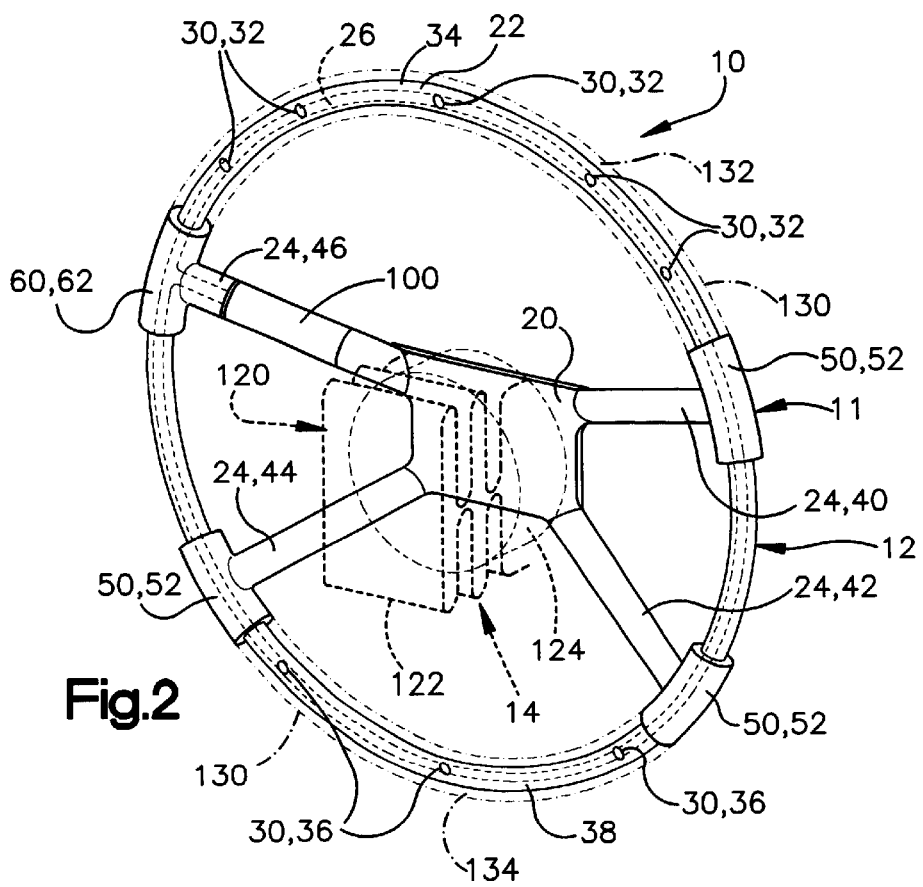
FIG. 2 is a perspective view of the apparatus of FIG. 1 with parts shown in phantom for clarity.

The rim 22 of the steering wheel armature 12 further includes a plurality of fluid exit openings 30 (FIG. 2). A first group 32 of the fluid exit openings 30 are spaced apart along an upper (as viewed in FIG. 2) portion 34 of the rim 22. A second group 36 of the fluid exit openings 30 are spaced apart along a lower (as viewed in FIG. 2) portion 38 of the rim 22.

The spokes 24 of the steering wheel armature 12 are preferably cast with the hub 20 out of an aluminum or magnesium material. Alternatively, the spokes 24 could be steel members that are cast into the hub 20. In accordance with the illustrated embodiment, there are four spokes 24 extending between the hub 20 and the rim 22. It should, however, be understood that the steering wheel armature 12 could have more or less than four spokes. Of the four spokes 24, first and second spokes 40 and 42 extend from the right side (as viewed in FIGS. 1 and 2) of the hub 20, while third and fourth spokes 44 and 46 extend from the left side (as viewed in FIG. 2) of the hub.

The first, second, and third spokes 40, 42, and 44 are generally cylindrical in shape and similar in construction. Each of the first, second, and third spokes 40, 42, and 44 includes an outer end portion 50 comprising a T-shaped knuckle 52. The knuckles 52 encircle the rim 22 of the steering wheel armature 12.

Figure 4:
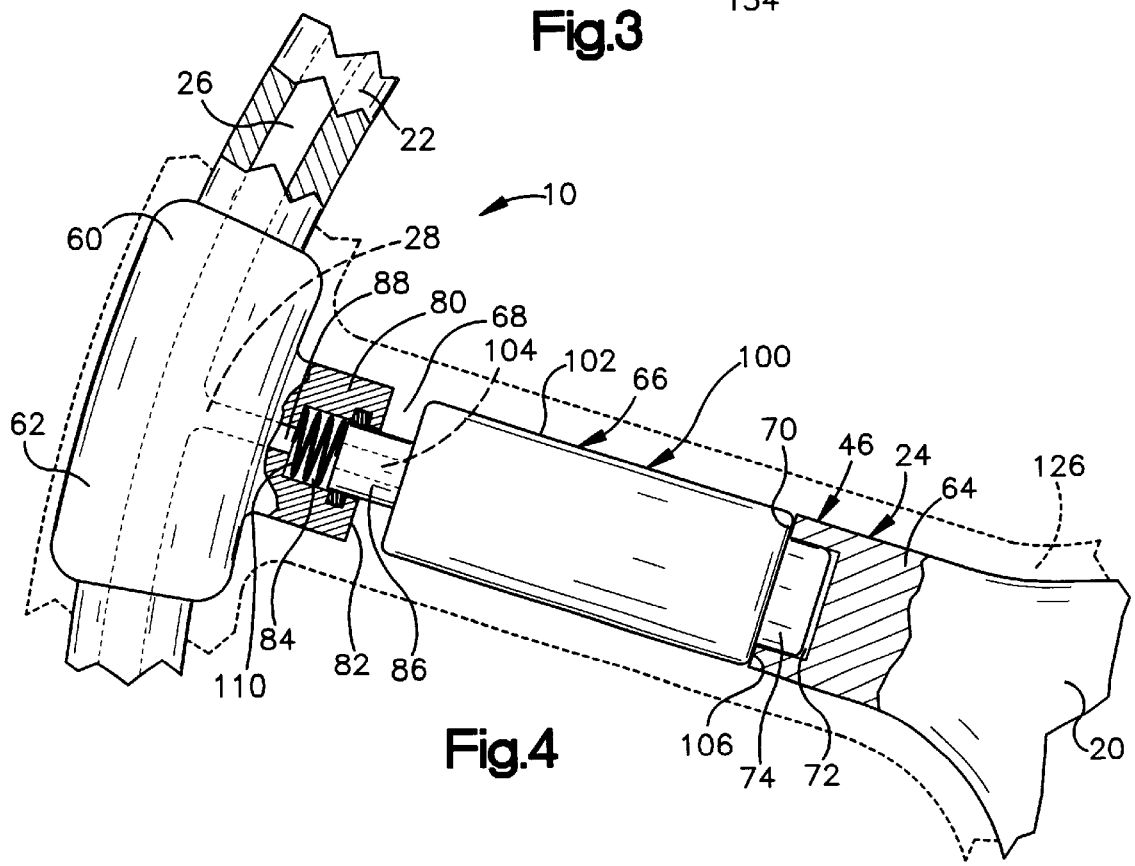
FIG. 4 is a sectional view of a portion of the apparatus of FIG. 1.

As best seen in FIG. 4, the fourth spoke 46 is defined by an outer end portion 60 that includes a T-shaped knuckle 62, an inner end portion 64 that adjoins the hub 20, and an insertable intermediate portion 66 extending between the inner and outer end portions. The inner and outer end portions 64 and 60 together define a receptacle 68 for receiving the intermediate portion 66.

The inner end portion 64 of the fourth spoke 46 is generally cylindrical in shape. The inner end portion 64 includes a first end surface 70 and a first recess 72 for receiving a first end 74 of the intermediate portion 66 of the fourth spoke 46.

The knuckle 62 at the outer end portion 60 of the fourth spoke 46 has a generally cylindrical arm portion 80 projecting radially inward. The arm portion 80 of the knuckle 62 includes a second end surface 82 and a second recess 84 for receiving a second end 86 of the intermediate portion 66 of the fourth spoke 46. The arm portion 80 of the knuckle 62 further includes a radially extending passage 88 that provides fluid communication between the second recess 84 and the fluid inlet port 28 that leads into the internal passage 26 in the rim 22 of the steering wheel armature 12.

In accordance with a primary feature of the present invention, the intermediate portion 66 of the fourth spoke 46 comprises an actuatable inflator 100. The inflator 100 is of known construction and is actuatable to provide inflation fluid for inflating one or more inflatable vehicle occupant protection devices, as discussed further below.

The inflator 100 has a main body portion 102 and the aforementioned first and seconds ends 74 and 86. The main body portion 102 has a generally cylindrical shape with a diameter that is approximately the same as the diameter as the inner end portion 64 of the fourth spoke 46 and the arm portion 80 of the knuckle 62.

The first end 74 of the inflator 100 fits snugly into the first recess 72 in the inner end portion 64 of the fourth spoke 46. The second end 86 of the inflator 100 fits snugly into the second recess 84 in the knuckle 62 at the outer end portion 60 of the fourth spoke 46 and is sealed by an O-ring or other suitable seal. The second end 86 of the inflator includes a fluid exit nozzle 104 that directs inflation fluid from the inflator 100 through the second recess 84 and into the passage 88 through the knuckle 62. It should be noted that the first end 74 of the inflator 100 is larger in diameter than the second end 86 of the inflator so that the inflator cannot be installed incorrectly (i.e., backwards). A spring 110 is positioned in the second recess 84 in the arm portion 80 of the knuckle 62. The spring 110 engages the second end 86 of the inflator 100 and biases the inflator away from the knuckle 62.

To install the inflator 100, the spring 110 is compressed by the second end 86 of the inflator, and the first end 74 of the inflator is inserted into the first recess 72. The bias of the spring 110 then pushes the first end 74 of the inflator 100 into the first recess 72 until an end surface 106 on the main body portion 102 of the inflator engages the end surface 70 on the inner end portion 64 of the fourth spoke 46. The inflator 100 thus snaps into place in the fourth spoke 46 and does not require fasteners to be installed.

As mentioned previously, the centrally located hub 20 of the steering wheel armature 12 is preferably cast out of an aluminum or magnesium material. An inflatable vehicle occupant protection device 14 in the form of an air bag module 120 (FIG. 2) is mounted to the hub 20 in a known manner (not shown). The air bag module 120 includes an inflatable air bag 122 and an actuatable inflator 124 for inflating the air bag.

Following the attachment of the air bag module 120 to the hub 20 and the installation of the inflator 100 into the fourth spoke 46, a layer 126 (FIG. 4) of polyurethane foam is applied over the air bag module 120, the hub 20, and the spokes 40–46. The layer 126 of polyurethane foam is also applied over the section of the rim 22 between the first and second spokes 40 and 42 and the section of the rim between the third and fourth spokes 44 and 46.

In accordance with another primary feature of the invention, the upper portion 34 of the rim 22 between the first spoke 40 and the fourth spoke 46 is coated and/or wrapped with an expandable material 130. The expandable material 130 on the upper portion 34 of the rim 22 covers the first group 32 of the fluid exit openings 30 and is expandable by inflation fluid from the inflator 100 to create an occupant protection device in the form of a first bladder 132 (FIG. 3).

Similarly, the lower portion 38 of the rim 22 between the second spoke 42 and the third spoke 44 is coated and/or wrapped with the expandable material 130. The expandable material 130 on the lower portion 38 of the rim 22 covers the second group 36 of the fluid exit openings 30 and is expandable by inflation fluid from the inflator 100 to create an occupant protection device in the form of a second bladder 134. It is contemplated that a thin, rupturable layer of polyurethane foam could also be applied over the expandable material 130 on the upper and lower portions 34 and 38 of the rim 22.

In the event of a vehicle collision, the inflator 100 in the fourth spoke 46 is actuated to provide inflation fluid for inflating the first and second bladders 132 and 134 on the upper and lower portions 34 and 38, respectively, of the rim 22. The inflation fluid flows through the fluid exit nozzle 104 of the inflator 100 and into the passage 88 in the knuckle 62 that leads to the internal passage 26 in the rim 22. The inflation fluid is then directed into the first and second bladders 132 and 134 through the first and second groups 32 and 36, respectively, of fluid exit openings 30 in the rim 22.

Figure 3:
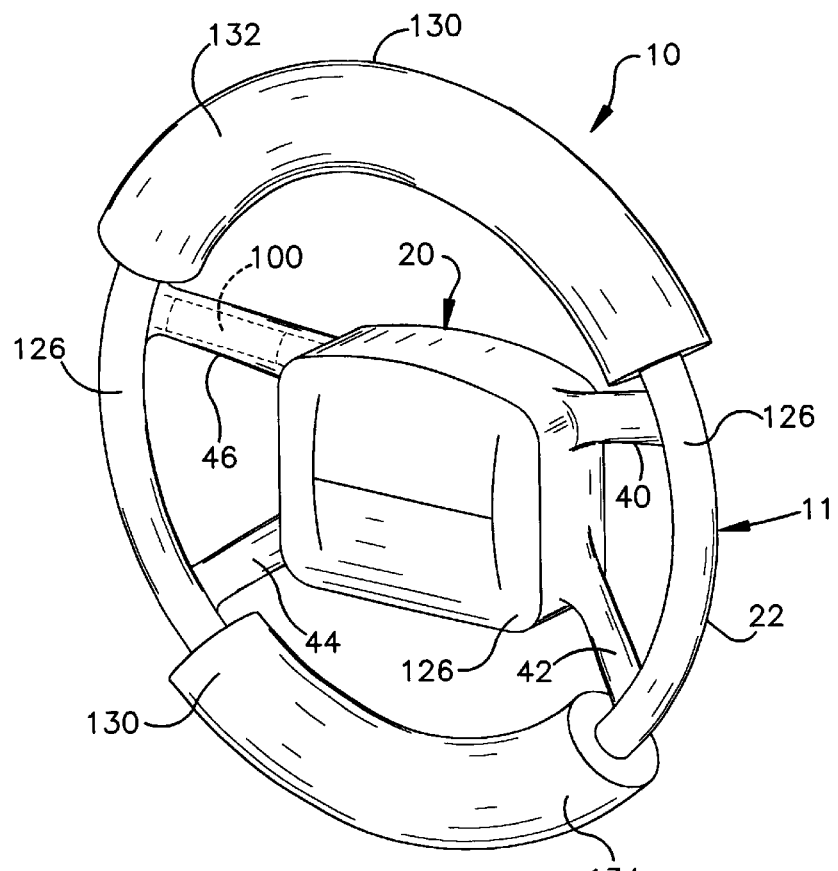
FIG. 3 is a perspective view illustrating parts of the apparatus of FIG. 1 in a partially deployed condition.

As shown schematically in FIG. 3, the bladders 132 and 134 inflate to a distance of 0.5 to 4 inches from the outer surface of the rim 22. The inflated bladders 132 and 134 will maintain or, in the event that the vehicle driver is out-of-position (e.g., leaning forward), increase the distance between the driver and the air bag module 120 as the inflator 124 begins to inflate the air bag 122. Increasing the distance between the driver and the air bag module 120 helps to re-position an out-of-position driver. By helping to re-position the driver prior to deployment of the air bag 122, the inflated bladders 132 and 134 improve the effectiveness of the air bag in helping to protect the vehicle driver from injury. Thus, there is preferably a slight delay between the actuation of the inflator 100 in the spoke 46 and the actuation of the inflator 124 in the air bag module 120. Further, it should be understood that known occupant position sensors could be used with the present invention to determine if the driver is out-of-position and control the actuation of the inflator 100 in the spoke 46.

Figure 5:
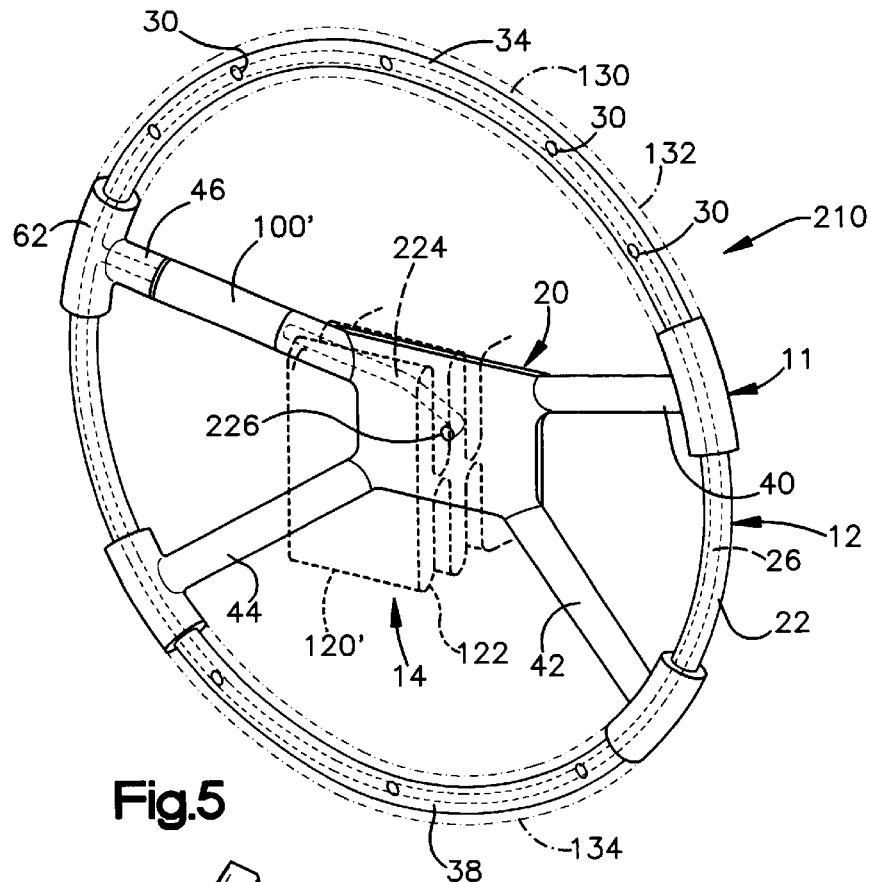
FIG. 5 is a perspective view of an apparatus for helping to protect a vehicle occupant constructed in accordance with a second embodiment of the present invention.
Figure 6:
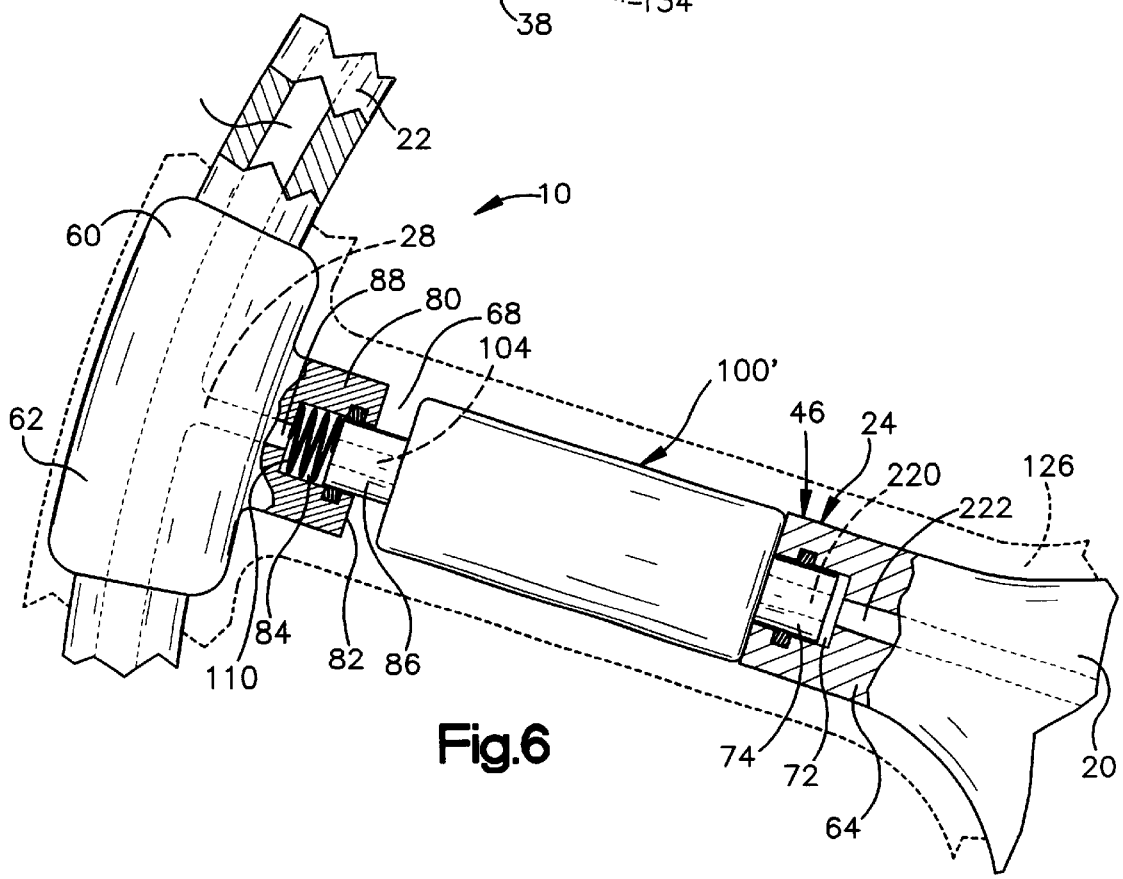
FIG. 6 is a sectional view of a portion of the apparatus of FIG. 5.

FIGS. 5 and 6 illustrate an apparatus 210 constructed in accordance with a second embodiment of the present invention. In the second embodiment of FIGS. 5 and 6, reference numbers that are the same as those used in the first embodiment of FIGS. 1–4 are used to designate parts that are the same as parts in the first embodiment.

In the apparatus 210 according to the second embodiment, an air bag module 120' mounted to the hub 20 of the steering wheel armature 12 does not include a separate inflator. Instead, an inflator 100' mounted in the fourth spoke 46 provides inflation fluid for inflating the first and second bladders 132 and 134, and also provides inflation fluid for inflating the driver-side air bag 122. The inflator 100' includes a second exit nozzle 220 (FIG. 6) at the second end 74 that is disposed in the first recess 72 in the inner end portion 64 of the fourth spoke 46. A fluid passage 222 extends from the first recess 72 and is in fluid communication with a fluid channel 224 formed in the hub 20 of the steering wheel armature 12. The air bag 122 is secured over an exit port 226 of the fluid channel 224.

The apparatus 210 according to the second embodiment of the present invention functions in a manner similar to the apparatus 10 according to the first embodiment of FIGS. 1–4. The apparatus operates to maintain or, in the event that the driver is out-of-position (e.g., leaning forward), increase the distance between the driver and the air bag 122 as the air bag begins to inflate. Increasing the distance between the driver and the air bag module 120' helps to re-position an out-of-position driver. By helping to re-position the driver prior to deployment of the air bag 122, the inflated bladders 132 and 134 improve the effectiveness of the air bag in helping to protect the vehicle driver from injury. As with the first embodiment, there is preferably a slight delay between the inflation of the bladders 132 and 134 and the inflation of the air bag 122. This delay can be achieved through appropriate construction of the inflator 100'. A particular advantage of the apparatus 210 according to the second embodiment is the reduction in size of the air bag module 120' mounted on the hub 20.

FIGS. 7–9 illustrate an apparatus 310 constructed in accordance with a third embodiment of the present invention. In the third embodiment of FIGS. 7–9, reference numbers that are the same as those used in the first embodiment of FIGS. 1–4 are used to designate parts that are the same as parts in the first embodiment.

In the apparatus 310 according to the third embodiment, there is no air bag module mounted to the hub 20 of the steering wheel armature 12. Instead, an inflatable first air bag 320 (FIG. 8) is folded and secured about the upper portion 34 of the rim 22 of the steering wheel armature 12. Further, an inflatable second air bag 330 (FIG. 9) is folded and secured about the lower portion 38 of the rim 22.

The first and second air bags 320 and 330 are covered with a rupturable wrapping 340 (FIG. 8) that tears to allow the air bags to deploy when supplied with inflation fluid from the inflator 100. An optional filler material 350 may be secured to the rim 22 under the rupturable wrapping 340 on the back side of the rim opposite the folded first and second air bags 320 and 330. The filler material 350 helps to maintain a uniform thickness for the steering wheel 11.

In the event of a vehicle collision, the inflator 100 in the fourth spoke 46 is actuated to provide inflation fluid for inflating the first and second air bags 320 and 330 on the upper and lower portions 34 and 38, respectively, of the rim 22. The inflation fluid flows through the fluid exit nozzle 104 of the inflator 100 and into the passage 88 in the knuckle 62 that leads to the internal passage 26 in the rim 22. The inflation fluid is then directed into the first and second air bags 320 and 330 through the fluid exit openings 30 in the rim 22. The inflated air bags 320 and 330, illustrated in FIG. 9, help to protect the vehicle driver from injury in much the same manner that a conventional hub-mounted driver-side air bag does. A particular advantage of the apparatus 310 according to the third embodiment is the elimination of an air bag module mounted on the hub 20.

From the above description of the invention, those skilled in the art will perceive improvements, changes and modifications. For example, it is contemplated that additional inflators 100 could be mounted in the other spokes 40, 42, and 44 of the steering wheel armature 12 if an increased capacity of inflation fluid were desired. Such improvements, changes and modifications within the skill of the art are intended to be covered by the appended claims.

Having described the invention, I claim:

1. An apparatus for helping to protect a vehicle occupant in the event of a vehicle collision, said apparatus comprising:

a vehicle steering wheel including a steering wheel armature, said steering wheel armature having a centrally located hub portion, a circumferentially extending rim portion, and at least one spoke extending between said rim portion and said hub portion;

at least one inflatable vehicle occupant protection device mounted on said steering wheel armature; and an actuatable inflator for, when actuated, inflating said at least one inflatable vehicle occupant protection device, said inflator forming at least a portion of said at least one spoke of said steering wheel armature;

wherein said rim portion of said steering wheel armature is hollow and is in fluid communication with said inflator mounted in said at least one spoke.

2. The apparatus of claim 1 wherein said steering wheel includes an expandable material covering a portion of said rim portion, a plurality of fluid exit openings being located in said portion of said rim portion covered by said expandable material.

3. The apparatus of claim 2 wherein said expandable material on said rim portion forms said at least one inflatable vehicle occupant protection device.

4. The apparatus of claim 3 wherein said expandable material on said rim portion further forms a second inflatable vehicle occupant protection device diametrically opposed to said one inflatable vehicle occupant protection device on said rim portion.

5. An apparatus for helping to protect a vehicle occupant in the event of a vehicle collision, said apparatus comprising:

a vehicle steering wheel including a steering wheel armature, said steering wheel armature having a centrally located hub portion, a circumferentially extending rim portion, and at least one spoke extending between said rim portion and said hub portion;

at least one inflatable vehicle occupant protection device mounted on said steering wheel armature; and an actuatable inflator for, when actuated, inflating said at least one inflatable vehicle occupant protection device, said inflator forming at least a portion of said at least one spoke of said steering wheel armature;

wherein said at least one inflatable vehicle occupant protection device includes an air bag mounted to said hub portion of said steering wheel armature, said hub portion of said steering wheel armature including at least one fluid passage for directing inflation fluid from said inflator into said air bag.

6. The apparatus of claim 5 wherein said rim portion of said steering wheel armature is hollow and is in fluid communication with said inflator mounted in said at least one spoke, said rim portion including a plurality of fluid exit openings.

7. The apparatus of claim 6 wherein said steering wheel includes an expandable material covering a portion of said rim portion, said plurality of fluid exit openings being located in said portion of said rim portion covered by said expandable material.

8. The apparatus of claim 7 wherein said expandable material on said rim portion forms a second inflatable vehicle occupant protection device.

9. The apparatus of claim 8 wherein said expandable material on said rim portion further forms a third inflatable vehicle occupant protection device diametrically opposed to said second inflatable vehicle occupant protection device on said rim portion.

10. An apparatus for helping to protect a vehicle occupant in the event of a vehicle collision, said apparatus comprising:

a vehicle steering wheel including a steering wheel armature, said steering wheel armature having a centrally located hub portion, a circumferentially extending rim portion, and at least one spoke extending between said rim portion and said hub portion;

at least one inflatable vehicle occupant protection device mounted on said steering wheel armature; and an actuatable inflator for, when actuated, inflating said at least one inflatable vehicle occupant protection device, said inflator forming at least a portion of said at least one spoke of said steering wheel armature;

wherein said rim portion of said steering wheel armature is hollow and is in fluid communication with said inflator mounted in said at least one spoke, said rim portion including a plurality of fluid exit openings.

11. The apparatus of claim 10 wherein said inflator snaps into a receptacle formed in said at least one spoke.

12. The apparatus of claim 11 wherein said inflator has oppositely disposed first and second ends, said first end adjoining said hub portion of said steering wheel armature, said second end adjoining said rim portion of said steering wheel armature and including a fluid exit nozzle.

13. The apparatus of claim 10 wherein said at least one inflatable vehicle occupant protection device comprises a first air bag located on said rim portion of said steering wheel armature.

14. The apparatus of claim 13 further comprising a second air bag located on said rim portion of said steering wheel armature, said second air bag being diametrically opposed to said first air bag on said rim portion.

15. The apparatus of claim 14 wherein said steering wheel further comprises a rupturable wrapping covering said first and second air bags on said rim portion.

* * * * *